(12) United States Patent
Yamazaki

(10) Patent No.: US 12,429,379 B2
(45) Date of Patent: Sep. 30, 2025

(54) IMAGE ANALYSIS METHOD, IMAGE ANALYSIS DEVICE, PROGRAM, AND RECORDING MEDIUM

(71) Applicant: FUJIFILM Corporation, Tokyo (JP)

(72) Inventor: Yoshiro Yamazaki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 377 days.

(21) Appl. No.: 18/192,379

(22) Filed: Mar. 29, 2023

(65) Prior Publication Data

US 2023/0243702 A1 Aug. 3, 2023

Related U.S. Application Data

(63) Continuation of application No. PCT/JP2021/032472, filed on Sep. 3, 2021.

(30) Foreign Application Priority Data

Oct. 2, 2020 (JP) .................................. 2020-167388

(51) Int. Cl.
*G06T 7/90* (2017.01)
*G01J 3/50* (2006.01)

(52) U.S. Cl.
CPC .................. *G01J 3/50* (2013.01); *G06T 7/90* (2017.01); *G06T 2207/10024* (2013.01)

(58) Field of Classification Search
CPC ...... G01J 3/50; G01J 3/52; G01J 3/524; G01J 1/50; G06T 7/90; G06T 2207/10024; G06T 2207/30204; G01L 1/241
(Continued)

(56) References Cited

U.S. PATENT DOCUMENTS 4,078,423 A 3/1978 Ogata et al.
6,480,625 B1 * 11/2002 Yamazaki .............. H04N 1/401
358/518
(Continued)

FOREIGN PATENT DOCUMENTS

CN 105376458 A 3/2016
CN 110675366 A 1/2020
(Continued)

OTHER PUBLICATIONS

The extended European search report issued by the European Patent Office on Feb. 27, 2024, which corresponds to European Patent Application No. 218750750-1020 and is related to U.S. Appl. No. 18/192,379.
(Continued)

*Primary Examiner* — Ali Bayat
(74) *Attorney, Agent, or Firm* — Studebaker Brackett PLLC

(57) ABSTRACT

Provided are an image analysis method, an image analysis device, a program, and a recording medium capable of accurately estimating an image signal value of an object color-developed by using a specific coloring material by using an image signal value of a color chip.
The embodiment of the present invention acquires a spectral characteristic of an object color-developed by using a specific coloring material, acquires a spectral characteristic of each of a plurality of color chips formed of coloring materials different from the specific coloring material, approximates the spectral characteristic of the object by using an approximation expression including the spectral characteristic of each of the plurality of color chips as variables, acquires an image signal value, which is obtained by imaging each of the plurality of color chips by an imaging device and which corresponds to color of a captured image, for each color chip, and estimates the image signal value, which is
(Continued)

obtained in a case where the object is imaged by the imaging device, based on the acquired image signal value for each color chip and the approximation expression.

19 Claims, 10 Drawing Sheets

(58) Field of Classification Search
USPC .......................................................... 382/162
See application file for complete search history.

(56) References Cited

U.S. PATENT DOCUMENTS

| | | | |
|---|---|---|---|
| 2006/0109351 A1 | 5/2006 | Ishii et al. | |
| 2010/0014753 A1* | 1/2010 | Tsuruoka | G06T 5/92 |
| | | | 382/165 |
| 2012/0150471 A1 | 6/2012 | Muto | |
| 2012/0296595 A1* | 11/2012 | Dalal | H04N 1/6052 |
| | | | 702/104 |
| 2013/0027720 A1* | 1/2013 | Satoh | H04N 1/60 |
| | | | 358/1.9 |
| 2014/0198328 A1 | 7/2014 | Katayama et al. | |
| 2015/0156369 A1* | 6/2015 | Reed | G06V 30/224 |
| | | | 382/100 |
| 2016/0044211 A1 | 2/2016 | Yamaguchi | |
| 2018/0122061 A1* | 5/2018 | Chatterjee | H04N 1/6086 |
| 2018/0243800 A1 | 8/2018 | Kumar et al. | |
| 2019/0219464 A1 | 7/2019 | Tanaka | |
| 2020/0089991 A1* | 3/2020 | Steenhoek | G06T 7/90 |
| 2022/0080759 A1 | 3/2022 | Tanaka | |

FOREIGN PATENT DOCUMENTS

| | | |
|---|---|---|
| JP | 2001-008220 A | 1/2001 |
| JP | 2001-258047 A | 9/2001 |
| JP | 2004-336657 A | 11/2004 |
| JP | 2006-339897 A | 12/2006 |
| JP | 2012-142920 A | 7/2012 |
| JP | 2015-095774 A | 5/2015 |
| JP | 2020-073907 A | 5/2020 |
| WO | 2018/062017 A1 | 4/2018 |

OTHER PUBLICATIONS

Office Action issued in TW 110134122; mailed by the Taiwanese Intellectual Property Office on Dec. 5, 2024.

International Search Report issued in PCT/JP2021/032472; mailed Nov. 22, 2021.

International Preliminary Report on Patentability (Chapter I) and Written Opinion of the International Searching Authority issued in PCT/JP2021/032472; issued Mar. 28, 2023.

"Notice of Reasons for Refusal" Office Action issued in JP 2022-553717; mailed by the Japanese Patent Office on Feb. 25, 2025.

An Office Action; mailed by the Intellectual Property of India on Aug. 29, 2024, which corresponds to Indian Patent Application No. 202347023884 and is related to U.S. Appl. No. 18/192,379.

An Office Action; mailed by the China National Intellectual Property Administration of the People's Republic of China on May 27, 2025, which corresponds to Chinese Patent Application No. 202180067409.3 and is related to U.S. Appl. No. 18/192,379.

* cited by examiner

FIG. 11

$$(c_1 \ c_2 \ c_3 \ \cdot \ \cdot \ \cdot \ c_i)$$

$$\times$$

$$\begin{pmatrix} R_{11}, & R_{21}, & R_{31}, & \ldots & R_{i1} \\ R_{12}, & R_{22}, & R_{32}, & \ldots & R_{i2} \\ R_{13}, & R_{23}, & R_{33}, & \cdot & \cdot & R_{i3} \\ & & & & & \\ R_{1n}, & R_{2n}, & R_{3n}, & \ldots & R_{in} \end{pmatrix}$$

$$=$$

$$(P_1 \ P_2 \ P_3 \ \cdot \ \cdot \ \cdot \ P_n)$$

IMAGE ANALYSIS METHOD, IMAGE ANALYSIS DEVICE, PROGRAM, AND RECORDING MEDIUM

CROSS-REFERENCE TO RELATED APPLICATIONS

This application is a Continuation of PCT International Application No. PCT/JP2021/032472 filed on Sep. 3, 2021, which claims priority under 35 U.S.C. § 119(a) to Japanese Patent Application No. 2020-167388 filed on Oct. 2, 2020. The above applications are hereby expressly incorporated by reference, in their entirety, into the present application.

BACKGROUND OF THE INVENTION

1. Field of the Invention

The present invention relates to an image analysis method, an image analysis device, a program, and a recording medium, and in particular, to an image analysis method, an image analysis device, a program, and a recording medium for estimating an image signal value of color of an object color-developed by using a specific coloring material.

2. Description of the Related Art

There is a case where an object, which is color-developed by using a specific coloring material, is imaged by an imaging device such as a camera, color of the object is specified from the image, and an amount of energy applied to the object is specified by using information related to the specified color.

On the other hand, the information, which is obtained from a captured image, for example, an image signal value of each color of red green blue (RGB) may change depending on a spectral sensitivity of the imaging device. Therefore, it is necessary to perform calibration or the like on the image signal value obtained by imaging a certain object in consideration of a difference in spectral sensitivity between the imaging devices.

In a device (color processing device) described in JP2012-142920A, a reference spectral reflectance is acquired by measuring a patch image by a reference machine of a spectral measurement machine, and a correction target spectral reflectance is acquired by creating a patch image by a spectral measurement machine that is a correction target machine. Thereafter, a correction coefficient is generated for each wavelength based on the reference spectral reflectance, and the correction target spectral reflectance is corrected for each wavelength by using the above correction coefficient. As a result, it is possible to correct the measurement result of the spectral reflectance obtained by the correction target machine with high accuracy in consideration of the difference in the spectral sensitivity between the models.

SUMMARY OF THE INVENTION

In a case where calibration is performed for each machine to be corrected as in the technique described in JP2012-142920A, it is necessary to image an object for each machine and acquire a signal value to be corrected for each machine. However, in consideration of the durability of the specific coloring material contained in the object, the time and effort required to prepare the object in a color-developed state, and the like, it is difficult to image an object for each machine and perform calibration for each machine.

For the above reasons, it is conceivable to use, instead of the actual object, a color chip formed to have the same color as the object by using a coloring material different from the specific coloring material, such as printing ink. However, in a case where in a case where the spectral characteristics are different between a coloring material contained in the object and a coloring material used to form the color chip, there is a possibility that the image signal value, which is obtained from the captured image of the color chip, differs from an actual image signal value of the object. That is, even in a case where it is an image signal value that is obtained by imaging a color chip as a substitute for the object, the image signal value may not be a signal value that correctly reproduces the image signal value of the object.

The present invention has been made in view of the above circumstances, and the object of the present invention is to solve the following problem. That is, the present invention solves the above-mentioned problems in the related art and the purpose is to provide an image analysis method, an image analysis device, a program, and a recording medium capable of accurately estimating an image signal value of an object color-developed by using a specific coloring material by using an image signal value of a color chip.

In order to achieve the above purposes, an image analysis method according to an aspect of the present invention comprises: a first acquisition step of acquiring a spectral characteristic of an object color-developed by using a specific coloring material; a second acquisition step of acquiring a spectral characteristic of each of a plurality of color chips, which are formed of coloring materials different from the specific coloring material and which have different colors from each other; an approximation step of approximating the acquired spectral characteristic of the object by using an approximation expression including the acquired spectral characteristic of each of the plurality of color chips as variables; a third acquisition step of acquiring an image signal value, which is obtained by imaging each of the plurality of color chips by an imaging device and which corresponds to color of a captured image, for each color chip; and an estimation step of estimating the image signal value, which is obtained in a case where the object is imaged by the imaging device, based on the image signal value acquired in the third acquisition step for each color chip, and the approximation expression.

According to the image analysis method of the present invention, it is possible to accurately estimate an image signal value, which is obtained in a case where an object is imaged by an imaging device, without depending on a spectral sensitivity of the imaging device by using the image signal value of each of the plurality of color chips.

Further, in the image analysis method of the aspect of the present invention, in the approximation step, the acquired spectral characteristic of the object may be approximated by using the approximation expression having a plurality of terms composed of the acquired spectral characteristic of each of the plurality of color chips and coefficients by which each of the spectral characteristics are multiplied, and in the estimation step, the image signal value, which is obtained in a case where the object is imaged by the imaging device, may be estimated by putting the image signal value corresponding to each of the terms, among the image signal values acquired in the third acquisition step for each color chip, into each of the plurality of terms included in the approximation expression.

According to the above configuration, it is possible to more easily estimate the image signal value, which is obtained in a case where the object is imaged by the imaging device, by putting the image signal value of each of the plurality of color chips into the approximation expression.

Further, in the image analysis method according to the aspect of the present invention, in the approximation step, it is more suitable that the acquired spectral characteristic of the object is approximated by using the approximation expression represented by a linear sum of the same number of the terms as the plurality of color chips.

According to the above configuration, it is possible to more easily estimate the image signal value to be obtained in a case where the object is imaged by the imaging device.

Furthermore, in the image analysis method of the aspect of the present invention, in the approximation step, it is more suitable that the coefficient of each of the plurality of terms is set within a range of −0.5 or more and 0.5 or less.

It is possible to suppress an excessive influence of the coefficient on the estimation result of the image signal value of the object by limiting a setting range of the coefficient of each term in the approximation expression.

Further, in the image analysis method of the aspect of the present invention, in the third acquisition step, each of the plurality of color chips may be imaged by a camera incorporating an image sensor that is the imaging device to acquire the image signal value for each color chip.

As described above, it is possible to easily acquire the image signal value of each color chip by imaging the plurality of color chips using the camera incorporating the image sensor to acquire the image signal value for each color chip.

Further, in the image analysis method of the aspect of the present invention, in the first acquisition step, a spectral reflectance of the object may be acquired, and in the second acquisition step, a spectral reflectance of each of the plurality of color chips may be acquired.

Alternatively, in the image analysis method of the aspect of the present invention, in the first acquisition step, a spectral transmittance of the object may be acquired, and in the second acquisition step, a spectral transmittance of each of the plurality of color chips may be acquired.

Further, in the image analysis method of the aspect of the present invention, the plurality of color chips may include a plurality of color charts having different colors from each other.

According to the above configuration, it is possible to accurately estimate the image signal value of the object by using the image signal value of each of the plurality of color chips including color charts having different colors from each other.

Further, in the image analysis method of the aspect of the present invention, the object may be a sheet body that contains the specific coloring material and that develops color according to an amount of external energy in a case where the external energy is applied.

According to the above configuration, the effect of the present invention that the image signal value of the object can be estimated with high accuracy becomes more meaningful.

Further, in the image analysis method of the aspect of the present invention, in the estimation step, the image signal value of a first object, to which a known amount of the external energy is applied, may be estimated. In this case, the image analysis method may further include: a fourth acquisition step of imaging a second object, to which an unknown amount of the external energy is applied, by the imaging device to acquire the image signal value of the second object; and a prediction step of predicting the amount of the external energy applied to the second object based on the acquired image signal value of the second object and the estimated image signal value of the first object.

According to the above configuration, it is possible to accurately estimate the image signal value of the second object. Further, it is possible to accurately predict the amount of external energy applied to the second object according to the correspondence relationship between the image signal value of the first object and the amount of the external energy applied to the first object and based on the estimation result of the image signal value of the second object.

Further, in order to solve the above-described problems, an image analysis device according to another aspect of the present invention comprises: a processor, in which the processor is configured to acquire a spectral characteristic of an object color-developed by using a specific coloring material, acquire a spectral characteristic of each of a plurality of color chips, which are formed of coloring materials different from the specific coloring material and which have different colors from each other, approximate the acquired spectral characteristic of the object by using an approximation expression including the acquired spectral characteristic of each of the plurality of color chips as variables, acquire an image signal value, which is obtained by imaging each of the plurality of color chips by an imaging device and which corresponds to color of a captured image, for each color chip, and estimate the image signal value, which is obtained in a case where the object is imaged by the imaging device, based on the acquired image signal value for each color chip and the approximation expression.

According to the image analysis device of the present invention, it is possible to accurately estimate an image signal value, which is obtained in a case where an object is imaged by an imaging device, without depending on a spectral sensitivity of the imaging device by using the image signal value of each of the plurality of color chips.

Further, in order to solve the above-described problems, a program according to still another aspect of the present invention is a program that causes a computer to execute each step included in any of the image analysis methods described above.

According to the program of the present invention, the image analysis method of the present invention can be realized by a computer. That is, by executing the above program, it is possible to accurately estimate an image signal value, which is obtained in a case where an object is imaged by an imaging device, without depending on a spectral sensitivity of the imaging device by using the image signal value of each of the plurality of color chips.

Further, a computer-readable recording medium, on which a program for causing a computer to execute each step included in any of the image analysis methods described above, can also be realized.

According to the present invention, it is possible to accurately estimate an image signal value, which is obtained in a case where an object is imaged by an imaging device, without depending on a spectral sensitivity of the imaging device by using the image signal value of each of the plurality of color chips.

Further, according to the present invention, it is possible to accurately predict the amount of the external energy applied to the object by using the estimated image signal value of the object, based on the correspondence relationship between the image signal value of the object and the amount of the external energy applied to the object.

BRIEF DESCRIPTION OF THE DRAWINGS

FIG. 11 is an expression for estimating an image signal value of the object.

DESCRIPTION OF THE PREFERRED EMBODIMENTS

A specific embodiment of the present invention (hereinafter, the present embodiment) will be described with reference to the accompanying drawings. However, the embodiment described below is merely an example for facilitating the understanding of the present invention, and does not limit the present invention. That is, the present invention can be modified or improved from the embodiment described below without departing from the spirit of the present invention. Further, the embodiment of the present invention includes an equivalent thereof.

Further, in the present specification, a numerical range represented by using "~" means a range including numerical values before and after "~" as the lower limit value and the upper limit value.

Further, in the present specification, the term "color" represents "hue", "chroma saturation", and "brightness", and is a concept including shading (density) and hue.

[Regarding Object According to Present Embodiment]

In describing the present embodiment, first, an object and use of the object will be described. The object according to the present embodiment (hereinafter referred to as the object S) contains a specific coloring material and is a sheet body that develops color according to an amount of external energy in a case where the sheet body is disposed in a measurement environment and the external energy is applied under the environment.

The "specific coloring material" is, for example, a coloring material composed of a color former and a color developer, which are microencapsulated in a support, specifically a coloring material composed of a color former and a color developer described in JP2020-073907A.

Figure 1:
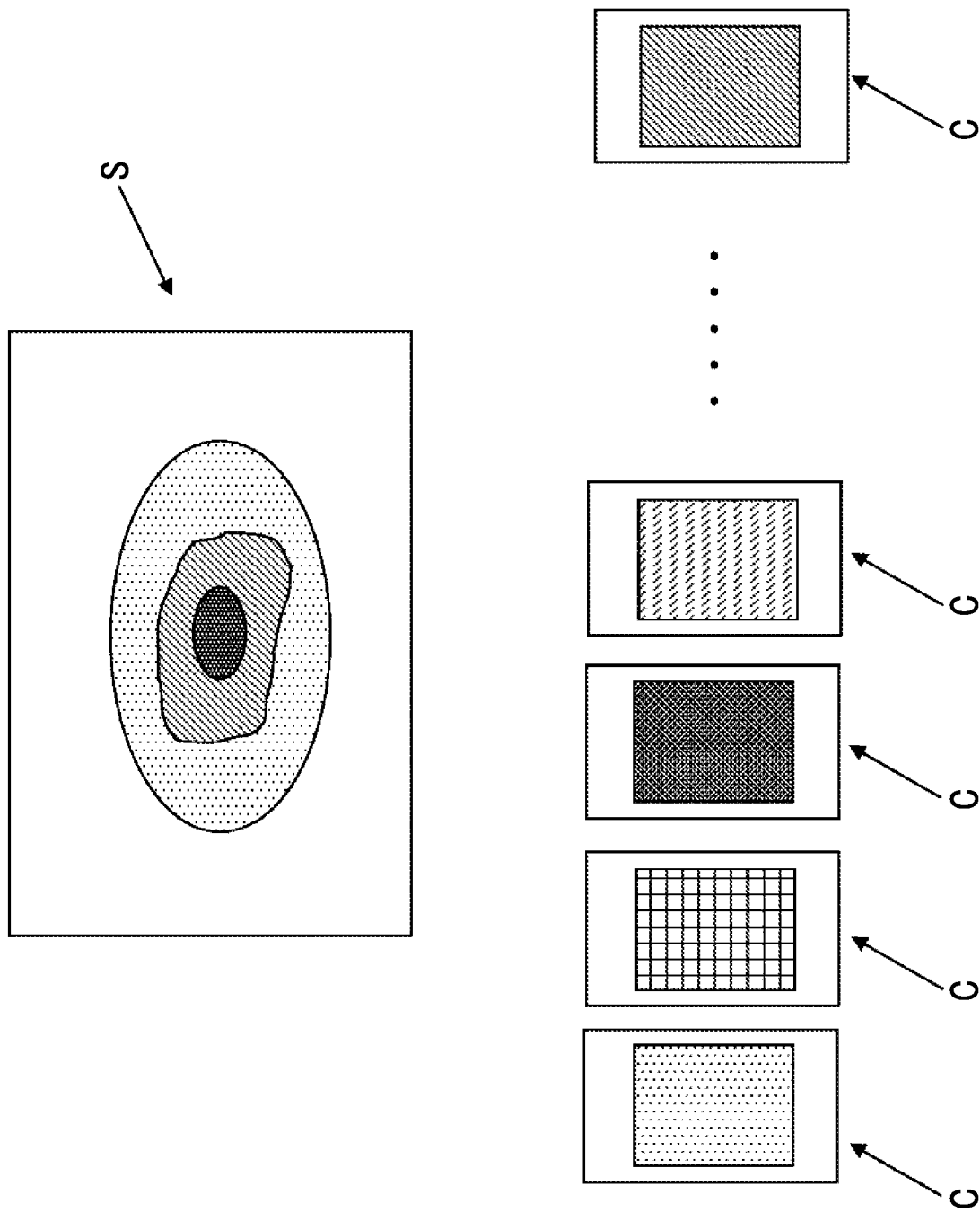
FIG. 1 is a diagram showing a color-developed object and a plurality of color chips.

The above color former and a color developer are coated to the object S, and in a case where the external energy is applied to the object S, the microcapsules are destroyed and the color former is adsorbed to the color developer. As a result, as shown in FIG. 1, the object S develops color of a predetermined color (strictly speaking, a predetermined hue). Further, the color (strictly speaking, the density, hereinafter referred to as the color optical density) of the color-developed object S is changed by changing the number of microcapsules to be destroyed according to the amount of the external energy applied.

The "external energy" is a force, heat, magnetism, energy waves such as ultraviolet rays and infrared rays, or the like applied to the object S in the measurement environment in which the object S is placed, and strictly speaking, is energy that causes the object S to develop color (that is, destruction of the microcapsules in the object S) in a case where these are applied.

Further, the "amount of external energy" is a momentary magnitude of the external energy (specifically, a force, heat, magnetism, energy waves, or the like acting on the object S) applied to the object S, for example. However, the embodiment of the present invention is not limited to this, and in a case where the external energy is continuously applied to the object S, the amount of the external energy may be a cumulative applied amount (that is, a cumulative value of amounts of a force, heat, magnetism, and energy waves acting on the object S) during a predetermined time.

The object S is used for measuring the amount of the external energy applied in the measurement environment. Specifically, the external energy is applied to the object S to cause the object S to develop color, the color-developed object S is imaged by the imaging device, and the amount of the external energy can be predicted by using the image signal value indicating the color (strictly speaking, color optical density) of the captured image.

Further, in a case where the amount of the applied external energy is not uniform in each part of the object S, each part of the object S develops color with a density corresponding to the amount of external energy, so that a distribution of color optical density occurs on a surface of the object S. By using the phenomenon, it is possible to measure (predict) a two-dimensional distribution of the amount of external energy applied to the object S from the distribution of the color optical density on the surface of the object S.

The object S is preferably made of a sufficiently thin material so that it can be disposed well in the measurement environment and may be made of paper, film, sheet, or the like. Further, the use of the object S, in other words, the type of the external energy measured (predicted) using the object S is not particularly limited. For example, the object S may be a pressure-sensitive sheet that develops color by applying pressure, a heat-sensitive sheet that develops color by applying heat, a photosensitive sheet that develops color by being irradiated with light, or the like.

In the following, a case where the object S is a pressure-sensitive sheet and the magnitude or a cumulative value of pressure applied to the object S is predicted will be described.

[Regarding Image Processing Device of Present Embodiment]

Figure 2:
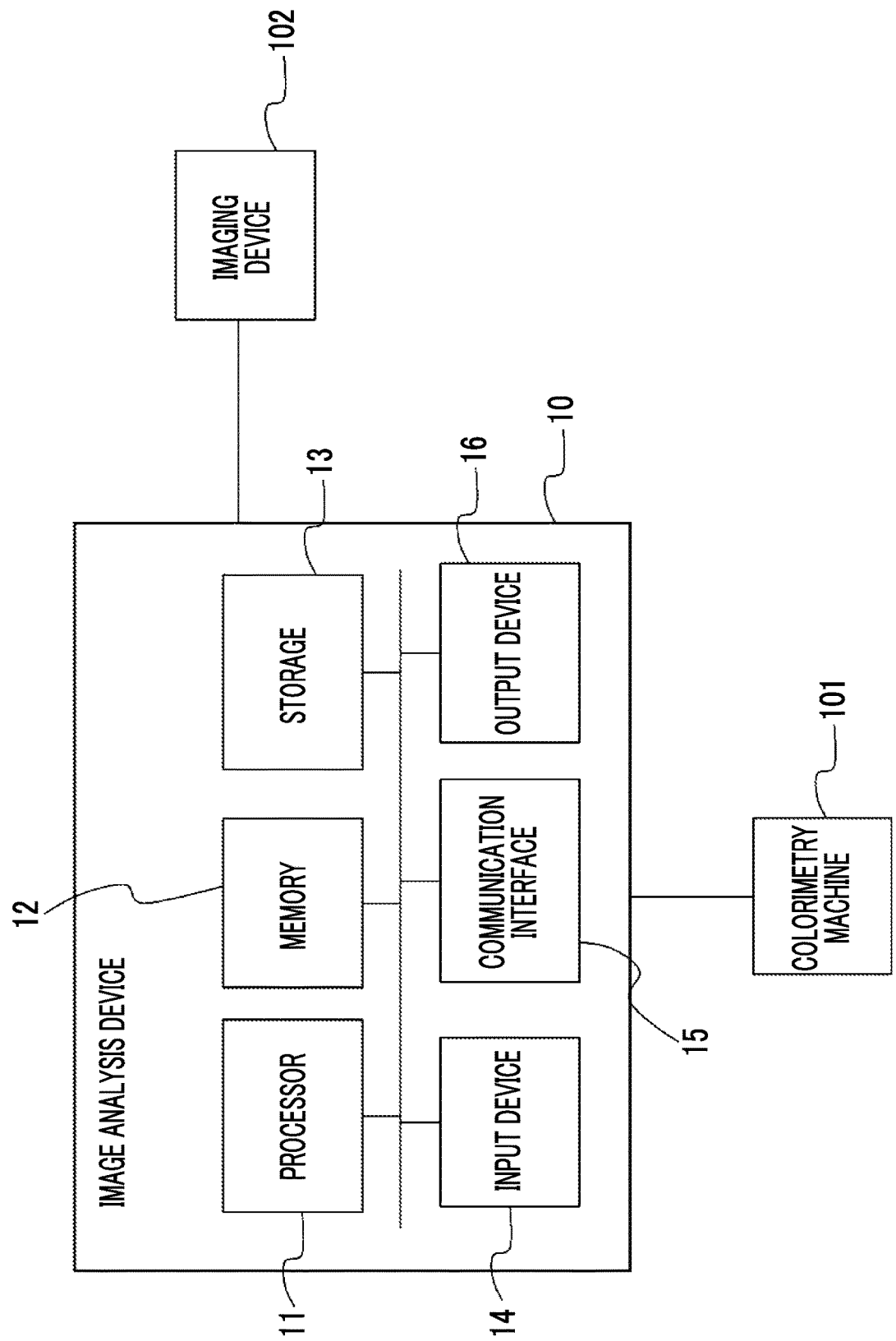
FIG. 2 is a diagram showing a configuration of an image analysis device according to an embodiment of the present invention.

An image analysis device (hereinafter, an image analysis device 10) of the present embodiment will be described with reference to FIGS. 2 and 3. As shown in FIG. 2, the image analysis device 10 is a computer that includes a processor 11. The processor 11 includes a central processing unit (CPU), which is a general-purpose processor, a programmable logic device (PLD), which is a processor whose circuit configuration is able to be changed after manufacturing such as a field programmable gate array (FPGA), a dedicated electric circuit, which is a processor having a circuit configuration specially designed to execute specific processing such as an application specific integrated circuit (ASIC), and the like.

The processor 11 performs a series of processes for image analysis by executing a program for image analysis. In other words, a plurality of processing units shown in FIG. 3, specifically, a spectral characteristic acquisition unit 21, a storage unit 22, an approximation unit 23, an image signal value acquisition unit 24, an estimation unit 25, and a prediction unit 26 are implemented by cooperation between the processor 11 and the program for image analysis. These processing units will be described in detail later.

Figure 3:
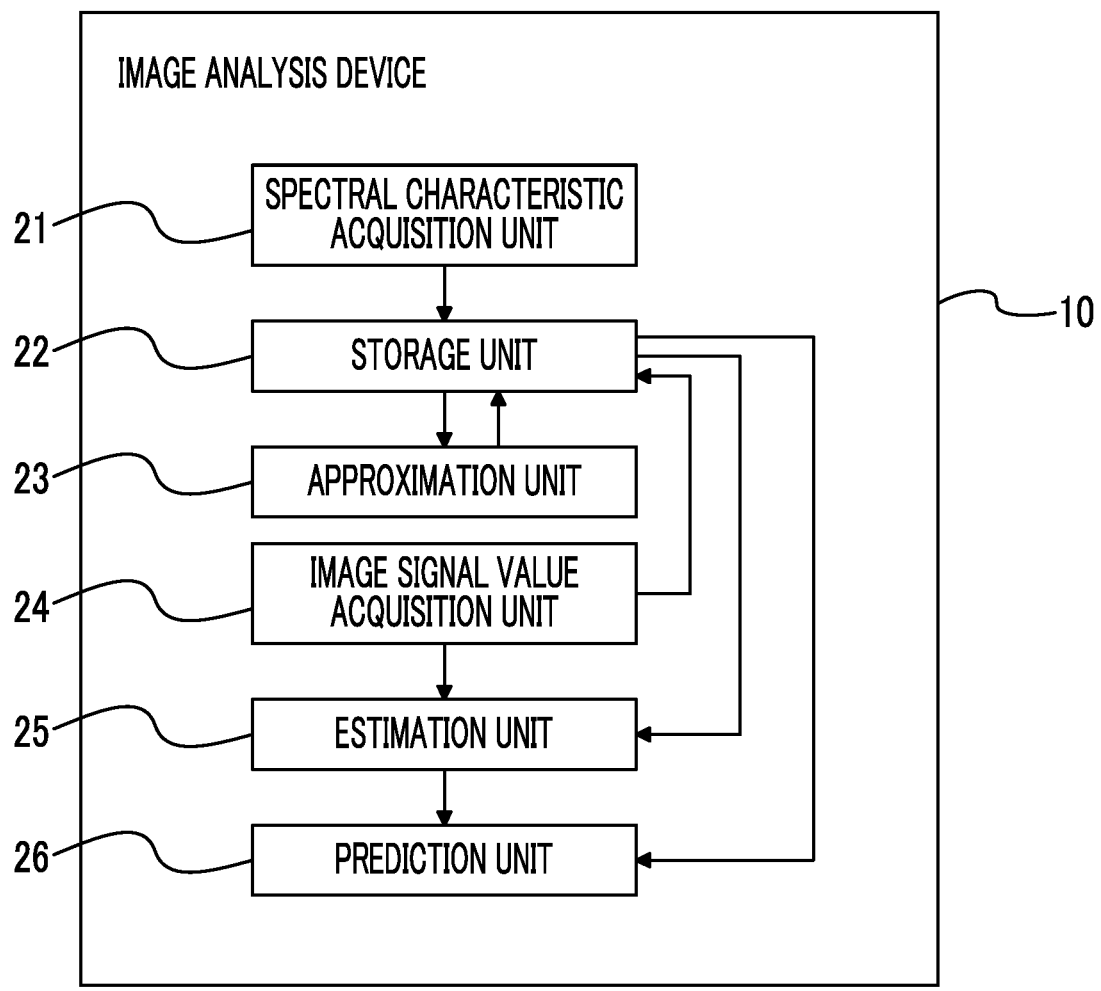
FIG. 3 is a diagram showing a function of the image analysis device according to the embodiment of the present invention.

The plurality of processing units shown in FIG. 3 may be configured with one of the plurality of types of processors described above or may be configured with a combination of two or more processors of the same type or different types, for example, a combination of a plurality of FPGAs, or may be configured with a combination of FPGAs and CPU. Further, the plurality of processing units shown in FIG. 3 may be configured with one of the plurality of types of processors described above or may be configured with one processor by collecting two or more processing units.

Further, for example, as represented by a computer such as a server and a client, a configuration can be considered in which one or more CPUs and software are combined to configure one processor, and this processor functions as the plurality of processing units shown in FIG. 3. Further, as represented by a system on chip (SoC) or the like, a configuration can also be considered in which a processor, which implements the functions of the entire system including a plurality of processing units with one integrated circuit (IC) chip.

Further, the hardware configuration of the various processors described above may be an electric circuit (circuitry) in which circuit elements such as semiconductor elements are combined.

The program for image analysis, which is executed by the processor 11, corresponds to the program of the embodiment of the present invention and is a program that causes the processor 11 to execute each step in an image analysis flow described later (specifically, steps S001 to S007 shown in FIG. 13). Further, the program for image analysis is recorded on a recording medium. Here, the recording medium may be a memory 12 and a storage 13 provided in the image analysis device 10 or may be a medium such as a compact disc read only memory (CD-ROM) that can be read by a computer. Further, a storage device, which is provided in an external apparatus (for example, a server computer or the like) capable of communicating with the image analysis device 10 may be used as a recording medium, and a program for image analysis may be recorded in the storage device of the external apparatus.

Further, the image analysis device 10 further includes an input device 14 and a communication interface 15 and receives a user's input operation by using the input device 14, or communicates with other devices via the communication interface 15 to acquire various types of information. The information acquired by the image analysis device 10 includes information necessary for image analysis, more specifically, information necessary for pressure measurement (pressure prediction) using the object S. The information includes, for example, the spectral characteristic of each of the object S and a plurality of color chips C described below, and captured images of the plurality of color chips C.

The spectral characteristics are spectral reflectance in the present embodiment and can be measured by a well-known colorimetry machine 101 (for example, "eXact" and "i1PRO" manufactured by X-Rite, "FD-7" and "FD-5" manufactured by Konica Minolta, or the like).

The captured image is an image captured by a well-known imaging device 102 such as a digital camera, an information processing terminal having an imaging function such as a smartphone or a tablet terminal, or a scanner or the like. In the present embodiment, the captured image is converted into data by digitizing video signals, which are output from an image sensor provided in the imaging device 102, and compressing the digitalized video signals in a predetermined format. The data of the captured image (hereinafter, referred to as image data) indicates an image signal value for each pixel. The image signal value is a value corresponding to the color of the captured image, specifically, is a gradation value of each pixel in the captured image defined within a predetermined numerical range (for example, 0 to 255 in the case of 8-bit data).

In the present embodiment, the imaging device 102 is a camera incorporating an imaging lens and an image sensor (an imaging element), and specifically, a color image is created as a captured image. That is, in the present embodiment, the image sensor is a color sensor of three RGB colors, and the image signal value indicated by the image data is a gradation value of each RGB color. However, the embodiment of the present invention is not limited to this, and the image signal value may be a gradation value of a monochrome image (specifically, a gray scale image).

In the embodiment shown in FIG. 2, the image analysis device 10, the colorimetry machine 101, and the imaging device 102 are individually separated, but the embodiment of the present invention is not limited to this. The image analysis device 10 may include either or both of a function of the colorimetry machine (that is, a function of measuring the spectral reflectance) and a function of the imaging device (that is, an imaging function).

Further, the image analysis device 10 includes an output device 16 such as a display and can output the result of the image analysis (for example, a prediction result of the pressure value described later) to the output device 16 to notify the user.

[Regarding Pressure Measurement Using Object in Related Art]

Next, pressure measurement using the object S in the related art will be described.

By applying a pressure, the object S develops color at a color optical density corresponding to the pressure value. The pressure value corresponds to the amount of external energy, and is a momentary magnitude of pressure or a cumulative amount of the pressure in a case where the pressure is continuously applied in a predetermined time.

By utilizing the above property, it is possible to measure the pressure value with respect to the pressure applied to the object S by using the color optical density of the object S. Particularly, the relationship between the color optical density and the pressure value, specifically, the correspondence relationship between the image signal values corresponding to each color optical density and the pressure value is obtained in advance. Then, the pressure value can be predicted from the image signal value obtained by imaging the object S, based on the correspondence relationship.

On the other hand, the image signal value depends on the spectral sensitivity of the imaging device and the like. Therefore, in a case where the object S is imaged by a certain imaging device, it is necessary to correct the image signal value of the captured image such that it becomes a predetermined image signal value, specifically, a reference image signal value corresponding to the color optical density of the object S. In order to perform this correction accurately, for example, it is necessary to create a correction sheet by using a coloring material having the same spectral characteristics as the coloring material (specifically, the color former and the color developer described above) used for the object S.

However, from the viewpoints of creation cost, creation time, durability of the coloring material, and discoloration (fading), it is difficult to create the correction sheet by using the above-mentioned coloring material. Therefore, in general, an alternative product such as a printed material that reproduces the same color (color optical density) as the color generated by the coloring material is used. This alternative product is usually created by using a coloring material different from the coloring materials described above, such as printing ink or paint, and there is a possibility that the spectral reflectance are different in a case where the coloring materials are different. Therefore, in a case where correction is performed by using an alternative product such as printed material, it is necessary to consider the influence of the difference in spectral reflectance of the coloring material between the alternative product and the object S on the image signal value before performing the correction.

In the related art, it is necessary to perform correction in consideration of the influence of the difference in the spectral reflectance of the coloring material as described above, and to perform correction every time the imaging device to be used changes. Therefore, the pressure measurement using the object S in the related art requires time and effort, and there is a risk that the work efficiency will be lowered.

On the other hand, in the image analysis method of the present embodiment performed using the image analysis device 10, it is possible to solve the above-mentioned problems that have arisen in the pressure measurement using the object S in the related art, and the pressure measurement using the object S can be performed accurately and efficiently. Hereinafter, the functions of the image analysis device 10 and the image analysis method of the present embodiment will be described in detail.

[Functions of Image Analysis Device of Present Embodiment]

To describe the configuration of the image analysis device 10 from a functional aspect, the image analysis device 10 includes the spectral characteristic acquisition unit 21, the storage unit 22, the approximation unit 23, the image signal value acquisition unit 24, the estimation unit 25, and the prediction unit 26 (see FIG. 3).

The spectral characteristic acquisition unit 21 acquires the spectral characteristics of the color-developed object S, strictly speaking, the spectral reflectance of a color-developed portion of the object S. In the present embodiment, in a case where the colorimetry machine 101 measures the spectral reflectance of the object S, the spectral characteristic acquisition unit 21 acquires the spectral reflectance of the object S by receiving the measurement result from the colorimetry machine 101. However, the embodiment of the present invention is not limited to this, and for example, the spectral characteristic acquisition unit 21 may acquire the spectral reflectance of the object S in a case where a user inputs the spectral reflectance of the object S, which is measured by the colorimetry machine 101, through the input device 14. Alternatively, the spectral reflectance of the object S may be acquired in a case where information related to the spectral reflectance of the object S is stored in an external computer and the image analysis device 10 communicates with the external computer through the communication interface 15.

The spectral characteristic acquisition unit 21 acquires the spectral reflectance for each color (specifically, for each color optical density) of the object S and acquires the spectral reflectance for each type of object S (in other words, for each type of coloring material used for the object S).

Further, the spectral characteristic acquisition unit 21 acquires the spectral characteristics of each of the plurality of color chips C, specifically, the spectral reflectance. As shown in FIG. 1, the plurality of color chips C include a plurality of color charts in which colors (hue, chroma saturation, and brightness) are different from each other, and are formed of a coloring material different from the specific coloring material used for the object S, for example, a general-purpose coloring material such as printing ink or paint. As the plurality of color chips C, for example, a Macbeth chart, a "Color Checker" manufactured by X-rite, or the like can be used. Further, the number of color chips C from which the spectral reflectance is acquired is not particularly limited, but is preferably 10 or more, more preferably 15 or more, and particularly preferably 20 or more.

Figure 4:
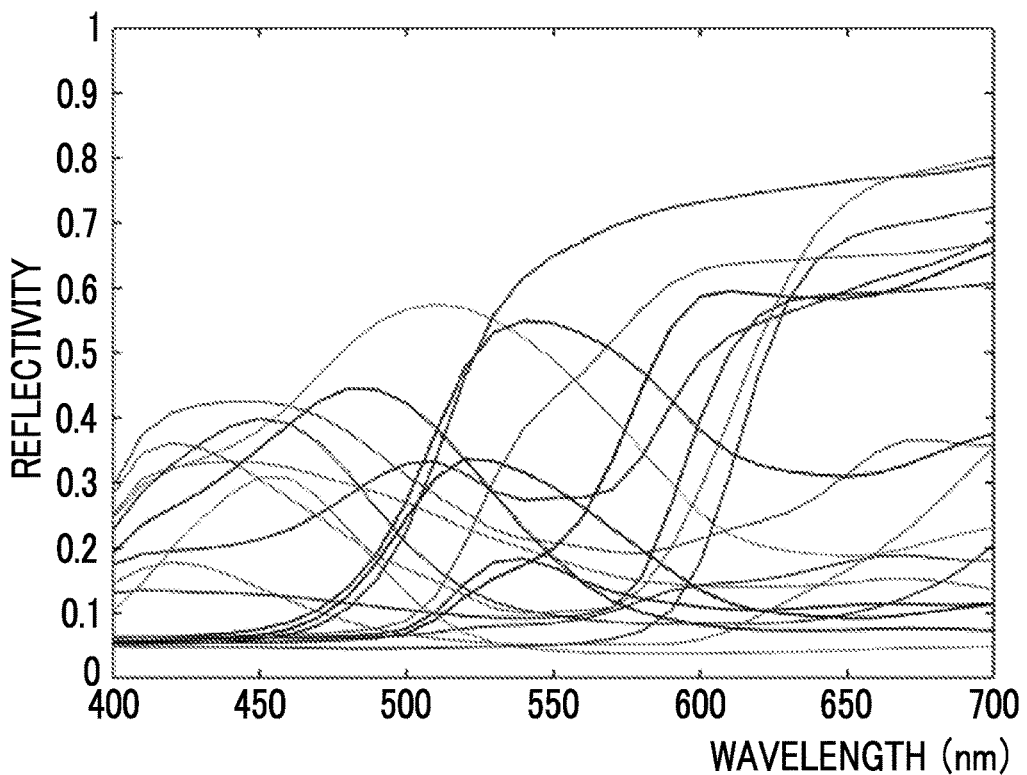
FIG. 4 is a diagram showing an example of a spectral reflectance of each of a plurality of color chips.

FIG. 4 shows an example of the spectral reflectance of each of the plurality of color chips C acquired by the spectral characteristic acquisition unit 21. The procedure for acquiring the spectral reflectance of the color chip C is the same as that for the object S.

The storage unit 22 stores various types of information necessary for image analysis, specifically, information necessary for pressure measurement using the object S. The information stored in the storage unit 22 includes the spectral reflectance of the object S and the spectral reflectance of each of the plurality of color chips C acquired by the spectral characteristic acquisition unit 21, an approximation expression obtained by the approximation unit 23, and the like.

The approximation unit 23 approximates the spectral reflectance of the object S acquired by the spectral characteristic acquisition unit 21 by using the approximation expression including, as variables, the spectral reflectance of each of the plurality of color chips C acquired by the spectral characteristic acquisition unit 21. In the present embodiment, the approximation expression has a plurality of terms composed of the spectral reflectance of each of the plurality of acquired color chips C and a coefficient by which each spectral reflectance is multiplied. To describe it more specifically, the approximation expression is a polynomial expression represented by a linear sum of the same number of terms as the plurality of color chips C, as shown in the following Expression (1).

$$P = c1 \times R1 + c2 + \ldots + ci \times Ri \qquad (1)$$

In the above Expression (1), P on the left side indicates the spectral reflectance of the object S (strictly speaking, the approximated spectral reflectance), R1 to Ri on the right side indicate the spectral reflectance (strictly speaking, acquired spectral reflectance) of the plurality of color chips C, and c1 to ci on the right side indicate coefficients. i is a natural number of 3 or more, and is the number of the plurality of color chips C.

In the coefficient of each term, the spectral reflectance of the object S approximated by the above approximation expression is set to be the closest to the actual spectral reflectance, that is, the spectral reflectance acquired by the spectral characteristic acquisition unit 21.

A specific setting method for the coefficients included in each of the plurality of terms in the above approximation expression is not particularly limited, and a well-known optimization method (for example, the method of least squares or the like) that is used in a case of obtaining an approximation expression can be used.

Further, the coefficient of each term may be set in any range, but it is preferable to limit a setting range of the coefficient, and it is particularly preferable to set the coefficient in a range of −0.5 to 0.5.

Further, the approximation unit 23 sets a group of coefficients $c_1$ to $c_i$ in the above approximation expression for each color of the object S (specifically, for each color optical density). Further, the approximation unit 23 sets the group of coefficients $c_1$ to $c_i$ for each type of the object S (in other words, for each type of the coloring material used for the object S). As a result, an approximation expression, in other words, a group of coefficients $c_1$ to $c_i$ is set for each of the spectral reflectance of the object S acquired by the spectral characteristic acquisition unit 21.

Figure 5:
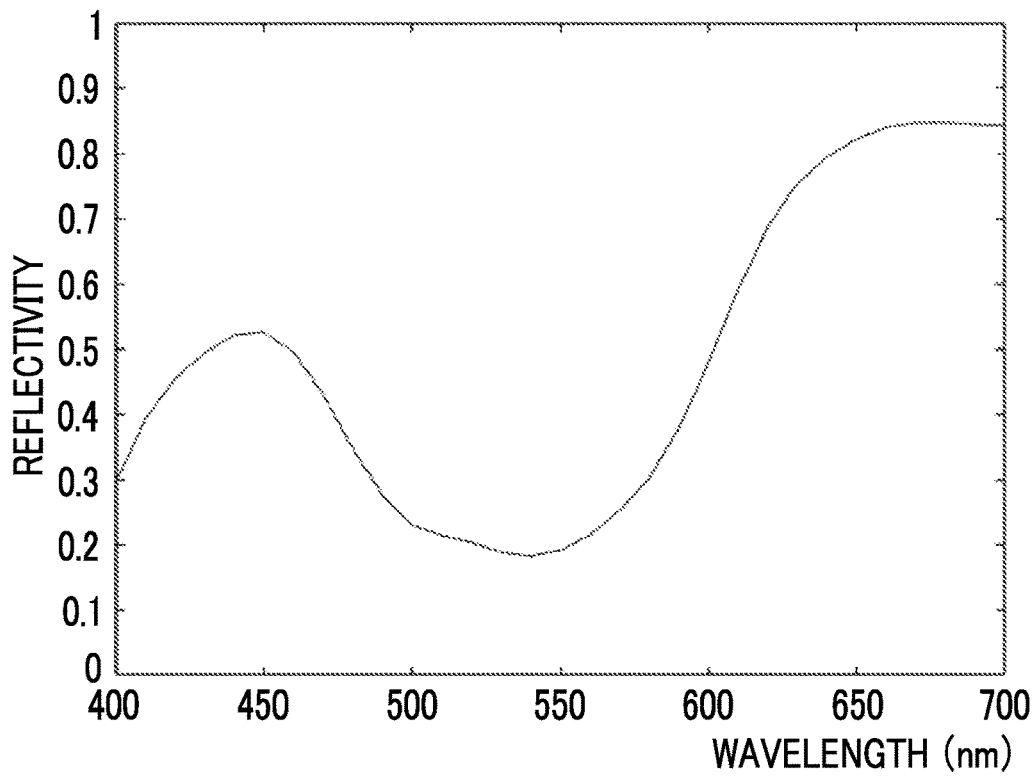
FIG. 5 is a diagram showing an example of a spectral reflectance of the object measured by a colorimetry machine (Part. 1).
Figure 6:
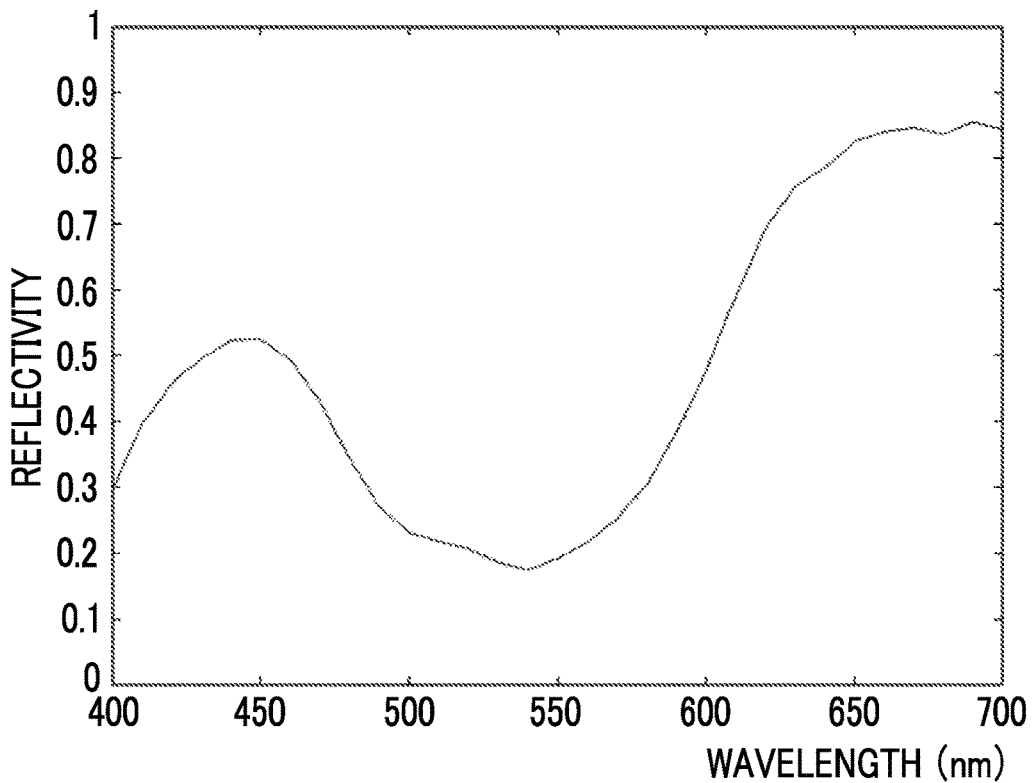
FIG. 6 is a diagram showing an example of the spectral reflectance of the object approximated by the spectral reflectance of the plurality of color chips (Part. 1).
Figure 7:
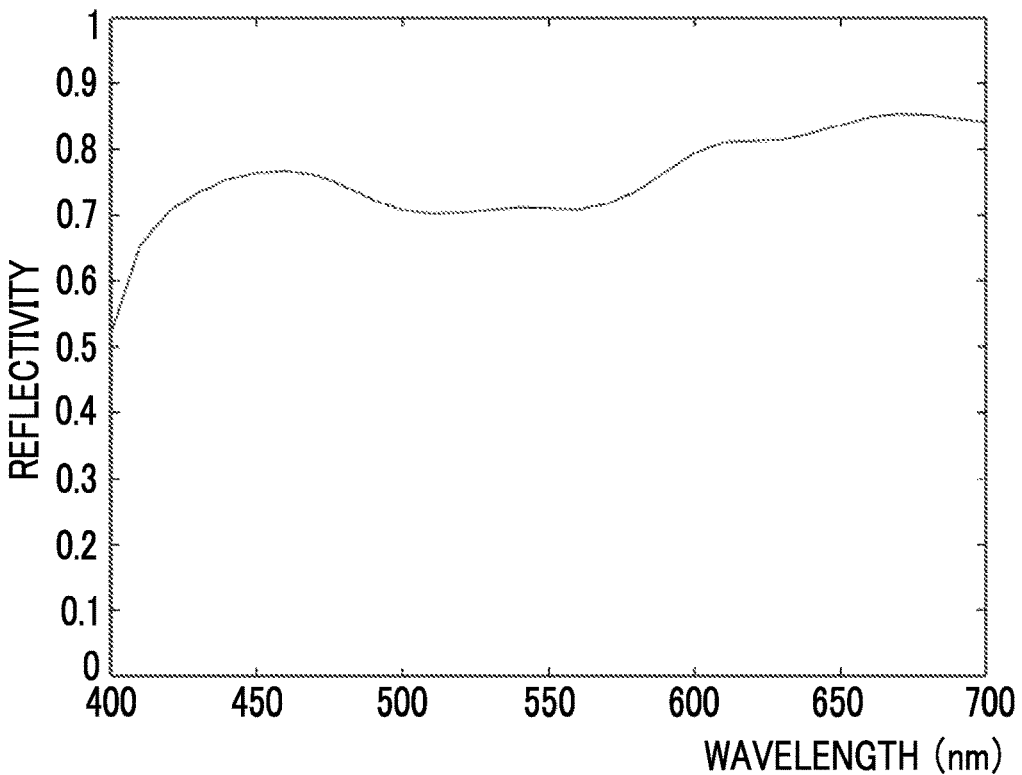
FIG. 7 is a diagram showing an example of a spectral reflectance of the object measured by a colorimetry machine (Part. 2).
Figure 8:
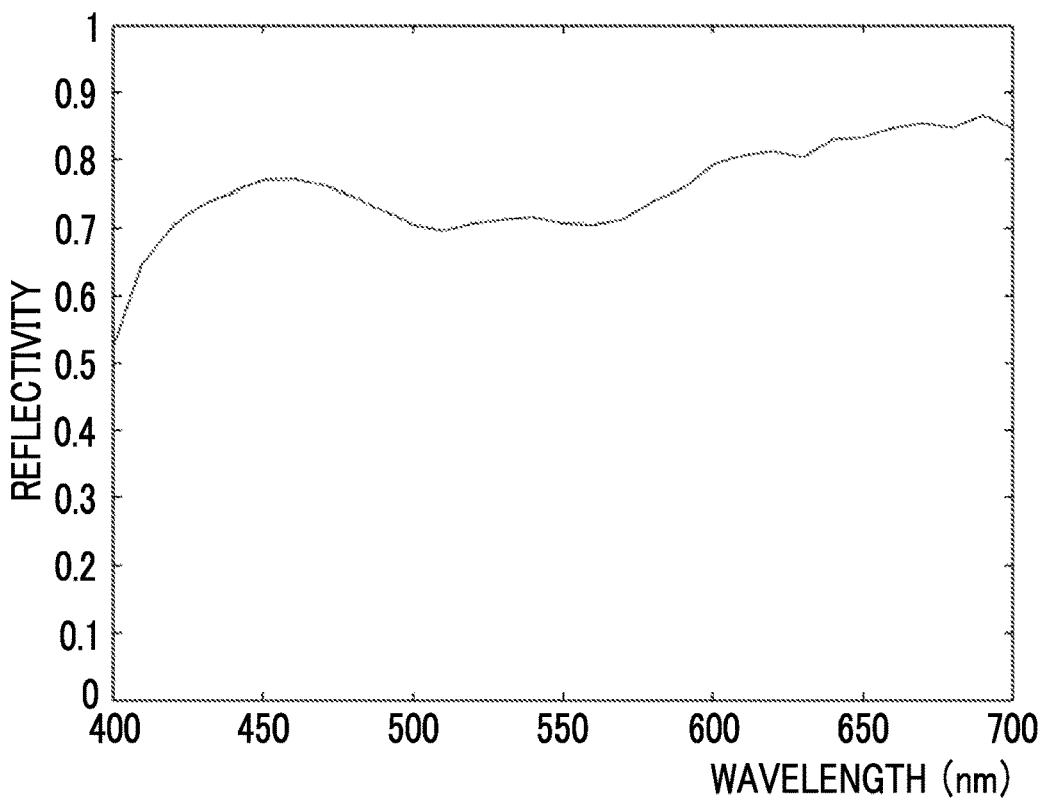
FIG. 8 is a diagram showing an example of the spectral reflectance of the object approximated by the spectral reflectance of the plurality of color chips (Part. 2).
Figure 9:
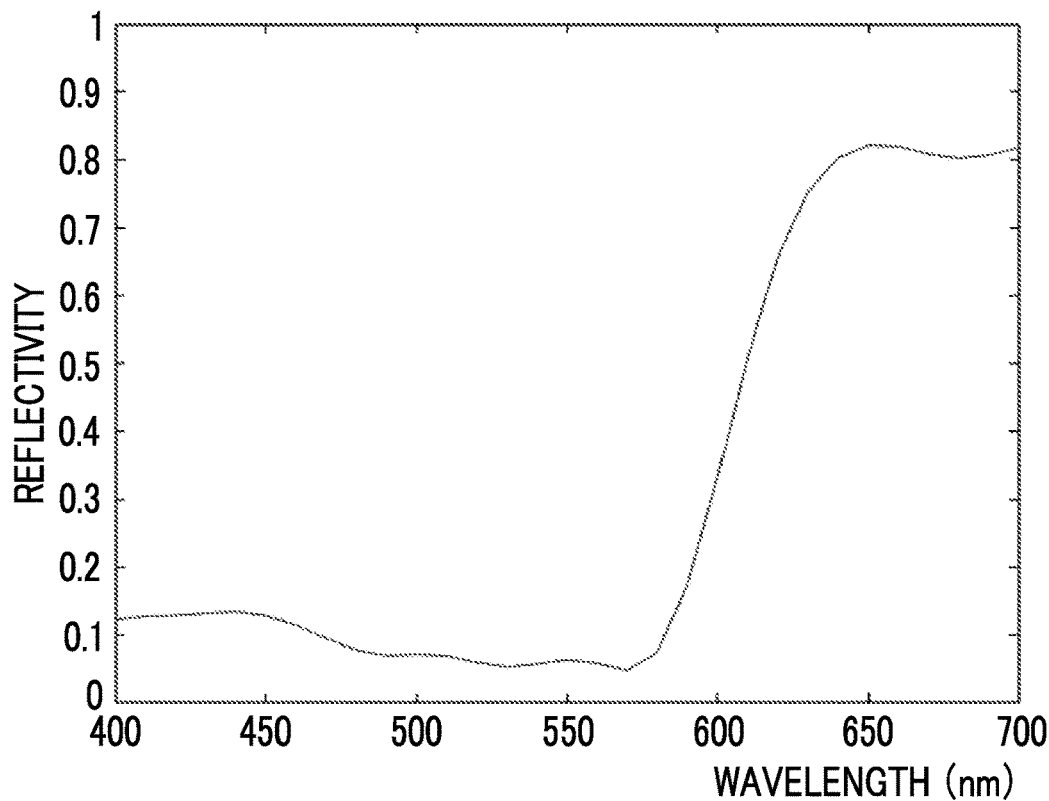
FIG. 9 is a diagram showing an example of a spectral reflectance of the object measured by a colorimetry machine (Part. 3).
Figure 10:
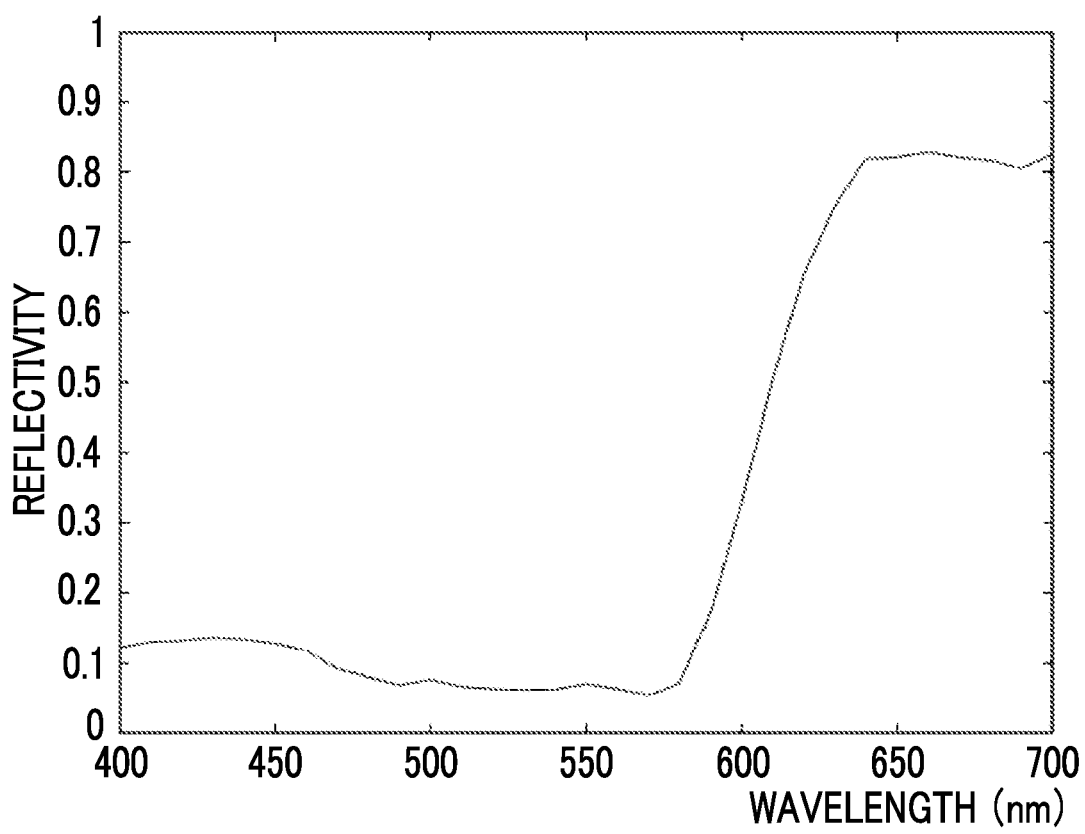
FIG. 10 is a diagram showing an example of the spectral reflectance of the object approximated by the spectral reflectance of the plurality of color chips (Part. 3).

An example of the spectral reflectance of the object S acquired by the spectral characteristic acquisition unit 21 is shown in FIGS. 5, 7, and 9, and the spectral reflectance approximated by the spectral reflectance (specifically, the spectral reflectance of 18 color chips C shown in FIG. 4) of the plurality of color chips C for the same object S are shown in FIGS. 6, 8, and 10.

The image signal value acquisition unit 24 acquires an image signal value (strictly speaking, an RGB image signal value) obtained by imaging each of the plurality of color chips C by the imaging device 102 for each color chip. In the present embodiment, each of the plurality of color chips C is imaged by a camera that is the imaging device 102, and the image signal value acquisition unit 24 receives the image data of each color chip C from the camera, and then the image signal value is acquired for each color chip. However, the embodiment of the present invention is not limited to this, and for example, the image signal value acquisition unit 24 may acquire the image signal value by performing an operation to transfer the image data of each color chip C from the camera to the image analysis device 10 by the user, specifically, by performing an operation of taking out the recording medium from the camera and attaching the recording medium to the image analysis device 10.

Further, the image signal value acquisition unit 24 acquires the image signal value by imaging the object S (hereinafter, referred to as a predicted object), which is disposed in the measurement environment and color-developed in a case where the pressure is applied, by the imaging device 102. The predicted object is an object S in which the pressure value of the applied pressure is unknown. The procedure for acquiring the image signal value of the predicted object is the same as in the case of the color chip C.

The estimation unit 25 estimates the image signal value of the object S based on the image signal value of each of the plurality of color chips C acquired by the image signal value acquisition unit 24 and the approximation expression set by the approximation unit 23. The image signal value of the object S, which is estimated by the estimation unit 25, is an image signal value obtained in a case where the object S is imaged by the imaging device 102.

In the present embodiment, the estimation unit 25 estimates the image signal value of the object S by putting the image signal values corresponding to the respective terms, among the image signal values acquired by the image signal value acquisition unit 24 for each color chip, into each of the plurality of terms included in the approximation expression. As a result, regardless of the spectral sensitivity of the imaging device 102, the image signal value of the object S under any spectral sensitivity can be estimated with high accuracy.

To describe it in an easy-to-understand manner, the image signal value of the object S is a value determined according to the product of the spectral sensitivity (the spectral sensitivity of the camera) in a case of acquiring the image signal value and the spectral reflectance of the object S. Here, the spectral reflectance P of the object S is approximated by the spectral reflectance $R_1, R_2, \ldots, R_i$ of the plurality of color chips C by using the above approximation expression. Therefore, as can be seen from the following Expression (2), the image signal values obtained in a case where the object S is imaged by a certain camera can be represented by a linear sum of products of image signal values, which are obtained in a case where the plurality of color chips C are imaged by the camera, and the coefficients $c_1$ to $c_i$.

Image signal value of object=[spectral sensitivity of camera]×[spectral reflectance of object]=[spectral sensitivity of camera]×[$c_1 \times R_1 + c_2 \times R_2 + \ldots + c_i \times R_i$]=$c_1$×[image signal value of coloring material 1]+$c_2$×[image signal value of coloring material 2]+ . . . +$c_i$×[image signal value of coloring material $i$] (2)

As described above, as shown in FIG. 11, the image signal values, which are obtained in a case where the object S is imaged by the camera having any spectral sensitivity, can be estimated by using the image signal values acquired for each color chip, by imaging the plurality of color chips C with each camera.

To describe the estimation expression shown in FIG. 11, $P_1, P_2, \ldots, P_n$ on the left side of the expression are estimated values of image signal values obtained in a case where the object S is imaged by cameras (cameras #1 to #n) having different spectral sensitivities from each other. Further, $R_{11}, R_{21}, R_{31}, \ldots, R_{i1}$ on the right side are image signal values for each color chip obtained by imaging the plurality of color chips C with the camera #1. Similarly, $R_{12}, R_{22}, R_{32}, \ldots, R_{i2}$ on the right side are image signal values for each color chip obtained by imaging the plurality of color chips C with the camera #2, and $R_{1n}, R_{2n}, R_{3n}, \ldots R_{in}$ on the right side are image signal values for each color chip obtained by imaging the plurality of color chips C with the camera #n.

Further, n is a natural number of 2 or more.

As described above, in the present embodiment, it is not necessary to image the object S each time the spectral sensitivity of the imaging device 102 changes, and there is no need to create a correction sheet such as a printed material formed in the same color as the object S. Therefore, the image signal value, which is obtained in a case where the object S is imaged at each spectral sensitivity, can be easily obtained (estimated) without adjusting the color (tint, density, or the like) of the correction sheet for each spectral sensitivity of the imaging device 102.

Further, although the spectral distribution of illumination may change in a case where the imaging environment changes in a case of imaging with a camera, in the present embodiment, it is possible to deal with various spectral distributions of illumination. That is, it is possible to estimate the image signal value, which is obtained in a case where the object S is imaged under the same illumination, by imaging each of the plurality of color chips C under a certain illumination to acquire image signal values, and putting the image signal values, which are acquired for each color chip, into the above approximation expression.

Further, in the present embodiment, the estimation unit 25 estimates the image signal value of the object S (hereinafter, referred to as an estimated object) for which the pressure value of the applied pressure is known. The estimated object corresponds to a first object to which a known amount of external energy is applied. On the other hand, the above-described predicted object corresponds to a second object to which an unknown amount of external energy is applied.

The prediction unit 26 predicts the pressure value of the pressure applied to the predicted object. In the present embodiment, the prediction unit 26 predicts the pressure value of the pressure applied to the predicted object based on the image signal value of the predicted object acquired by the image signal value acquisition unit 24 and the image signal value of the estimated object estimated by the estimation unit 25.

To describe it specifically, as described above, the estimated object is an object S in which the pressure value of the applied pressure is known. Further, a correlation is present between the image signal value of the estimated object and the pressure value of the pressure applied to the estimated object. That is, a plurality of estimated objects (that is, a plurality of objects S having the same coloring material and different color optical densities) are prepared by setting the pressure value to a plurality of values, and the image signal value of each estimated object is estimated by using the above procedure. As a result, the correspondence relationship between the image signal value and the pressure value as shown in FIG. 12 is specified.

Figure 12:
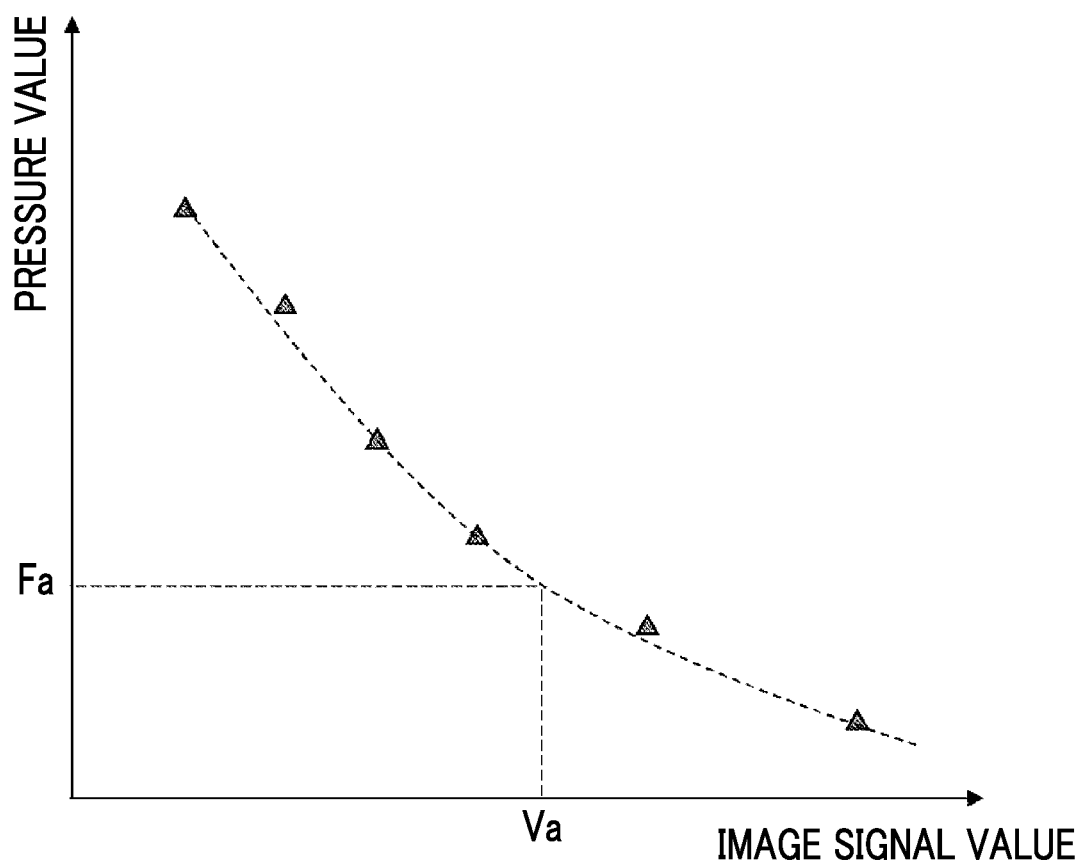
FIG. 12 is a diagram showing a correspondence relationship between an image signal value of the object and an amount of external energy applied to the object.

According to the specified correspondence relationship, as shown in FIG. 12, the pressure value of the pressure applied to the predicted object (indicated by symbol Fa in the figure) can be predicted by using the image signal value of the predicted object (indicated by symbol Va in the figure).

The prediction result of the pressure value predicted by the prediction unit 26, that is, the unknown pressure value applied to the predicted object is output to the output device 16. As a result, the user can check the predicted pressure value.

[Regarding Image Analysis Flow of Present Embodiment]

Hereinafter, an image analysis flow performed using the image analysis device 10 will be described with reference to FIG. 13. The image analysis flow shown in FIG. 13 is performed by using the image analysis method of the embodiment of the present invention, in other words, each step in the image analysis flow corresponds to each step configuring the image analysis method of the embodiment of the present invention.

In the image analysis flow, first, a first acquisition step S001 and a second acquisition step S002 are performed. In the first acquisition step S001, the spectral characteristics of the color-developed object S, specifically, the spectral reflectance measured by the colorimetry machine 101 is acquired. In the first acquisition step S001 in the present embodiment, the spectral reflectance of the object S (that is, the estimated object) for which the pressure value of the applied pressure is known is acquired.

In the second acquisition step S002, the spectral characteristics of each of the plurality of color chips C, specifically, the spectral reflectance measured by the colorimetry machine 101 is acquired. In FIG. 13, the second acquisition step S002 is to be performed after the first acquisition step S001 is performed, but the embodiment of the present invention is not limited to this, and the second acquisition step S002 may be performed before the first acquisition step S001 is performed or in parallel with the first acquisition step S001.

Next, an approximation step S003 is performed. In the approximation step S003, the spectral reflectance of the object S (strictly speaking, the estimated object) acquired in the first acquisition step S001 is approximated by using an approximation expression including the spectral reflectance of each of the plurality of color chips C acquired in the second acquisition step S002, as variables. For details, as in the above approximation Expression (1), an approximation expression, which is obtained by adding a plurality of terms consisting of products of the spectral reflectance and coefficients for each color chip, that is, represented by a linear sum, is obtained, specifically, the spectral reflectance of the acquired object S (estimated object) is approximated by setting the coefficient of each term by using an optimization method such as the method of least squares.

In the approximation step S003, it is preferable to set the coefficient (that is, a group of coefficients $c_1$ to $c_i$) of each term in the approximation expression within a predetermined numerical range, specifically within a range of −0.5 to 0.5. In this case, in the subsequent estimation step S005, it is possible to suppress an excessive influence of the coefficient of each term on the estimation result of the image signal value of the object S. In a case where a setting range of the coefficient is not limited and the coefficient is set to a relatively large value, and in a case where an error is included in the image signal value of each color chip C, which is put into the approximation expression, the influence of the error on the estimation result increases according to the magnitude of the coefficient. In contrast, in a case where the coefficient of each term is set in the range of −0.5 to 0.5, the influence of the error can be made smaller.

Thereafter, a third acquisition step S004 is performed. In the third acquisition step S004, each of the plurality of color chips C is imaged by a camera having a built-in image sensor (strictly speaking, a color sensor), and the image signal value is acquired for each color chip.

After performing the third acquisition step S004, the estimation step S005 is performed. In the estimation step S005, the image signal value of the object S, strictly speaking, the image signal value of the estimated object is estimated based on the image signal value acquired in the third acquisition step S004 for each color chip and the approximation expression set in the approximation step S003. Specifically, the image signal value corresponding to each term, among the image signal values acquired for each color chip, is put into each of the plurality of terms included in the approximation expression. As a result, the image signal value of the estimated object is estimated.

Further, in the image analysis flow, a fourth acquisition step S006 is performed. In the fourth acquisition step S006, the object S (that is, a predicted object) in which the pressure value of the applied pressure is unknown, is imaged by the same camera as used in the third acquisition step S004, and the image signal value is acquired. In FIG. 13, the fourth acquisition step S006 is to be performed after the estimation step S005 is performed, but the embodiment of the present invention is not limited to this, and the fourth acquisition step S006 may be performed before the estimation step S005 is performed, for example, the fourth acquisition step S006 may be performed after the third acquisition step S004 is performed or in parallel with the third acquisition step S004.

After performing the fourth acquisition step S006, the prediction step S007 is performed. In the prediction step S007, the pressure value of the pressure applied to the predicted object is predicted based on the image signal value of the predicted object acquired in the fourth acquisition step S006 and the image signal value of the estimated object estimated in the estimation step S005. Specifically, the pressure value of the pressure applied to the predicted object is predicted by using the image signal value of the predicted object based on the correspondence relationship between the estimation result of the image signal value of the estimated object and the pressure value of the pressure applied to the estimated object.

The image analysis flow is ended immediately before a timing of moment when the series of steps S001 to S007 described above is ended.

Other Embodiments

The embodiment described so far is a specific example of easy-to-understand explanations of an image analysis method, an image analysis device, a program, and a recording medium of the embodiment of the present invention. This is merely an example, and other embodiments are possible.

Figure 13:
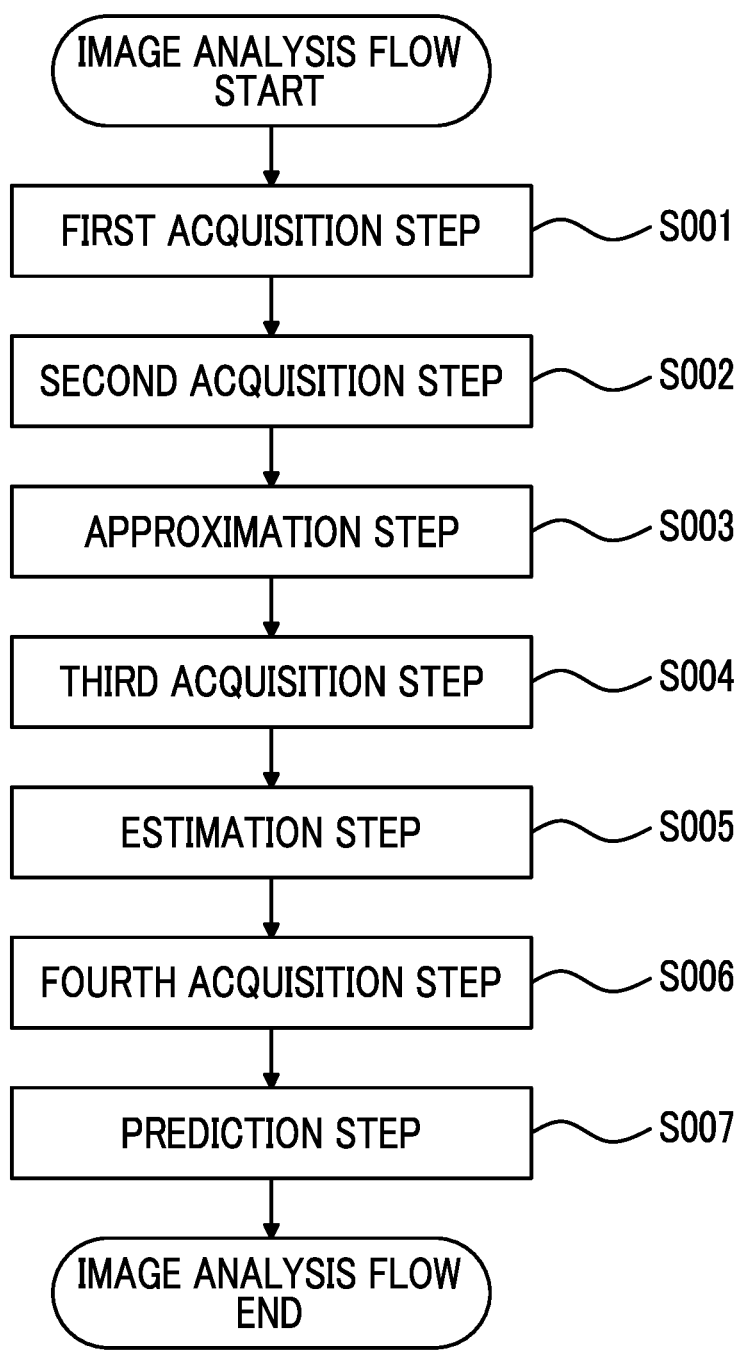
FIG. 13 is a diagram showing a flow of an image analysis flow.

In the above-described embodiment, it is assumed that a series of steps related to the pressure measurement using the object S, that is, all steps S001 to S007 in the image analysis flow shown in FIG. 13 are executed by a computer that constitutes the image analysis device 10. However, the embodiment of the present invention is not limited to this, and for example, the prediction step S007 of predicting the pressure value of the pressure applied to the object S (strictly speaking, the predicted object) may be performed by the user, that is, by manpower instead of the computer.

Further, in the above embodiment, the spectral reflectance is acquired as the spectral characteristics of each of the object S and the plurality of color chips C, but the spectral characteristics other than spectral reflectance, for example, the spectral transmittance may be acquired. That is, in the first acquisition step S001 during the image analysis flow, the spectral transmittance of the object S may be acquired, and in the second acquisition step S002, the spectral transmittance of each of the plurality of color chips C may be acquired. In this case, in the approximation step S003, the spectral transmittance of the acquired object S is approximated by using an approximation expression including the spectral transmittance of each acquired color chip C as a variable.

The spectral transmittance can be measured by a well-known transmittance measurement machine (for example, "TLN-110/110v" manufactured by Tokai Optical Co., Ltd., "TLV-304-BP" manufactured by Asahi Spectra Co., Ltd., or the like).

Further, in the above embodiment, it is assumed that a plurality of terms, which are composed of spectral reflectance for each color chip and coefficient, are included, and more specifically, the spectral reflectance of the object S is approximated by using the approximation expression represented by a linear sum of the same number of terms as the plurality of color chips C. However, the embodiment of the present invention is not limited to this, for example, the spectral reflectance of the object S may be approximated by using an approximation expression in which one term includes the spectral reflectance of two or more color chips, or by using an approximation expression represented in a form other than a linear sum.

Further, in the above-described embodiment, it is assumed that the imaging device, which is used for acquiring the image signal value of each of the object S (specifically, the predicted object) and the plurality of color chips C, is a camera with a built-in image sensor. However, the embodiment of the present invention is not limited to this, and a scanner may be used as the imaging device instead of the camera. In a case where the scanner is used as the imaging device, the distribution of the spectral sensitivity and the spectral distribution of the illumination at the time of imaging may change as the model of the scanner changes. Even in such a case, by applying the image analysis method of the embodiment of the present invention, it is possible to cope with the changed model of the scanner. That is, the image signal value, which is obtained in a case where the object S is imaged (read) with the same scanner, can be estimated by imaging (reading) each of the plurality of color chips C with the changed model of the scanner to acquire the image signal values and putting the image signal values acquired for each color chip into the approximation expression.

EXPLANATION OF REFERENCES

10: image analysis device
11: processor
12: memory
13: storage
14: input device
15: communication interface
16: output device
21: spectral characteristic acquisition unit
22: storage unit
23: approximation unit
24: image signal value acquisition unit
25: estimation unit
26: prediction unit
101: colorimetry machine
102: imaging device
C: color chip
S: object

What is claimed is:

1. An image analysis method comprising:
a first acquisition step of acquiring a spectral characteristic of an object color-developed by using a specific coloring material;
a second acquisition step of acquiring a spectral characteristic of each of a plurality of color chips, which are formed of coloring materials different from the specific coloring material and which have different colors from each other;
an approximation step of approximating the acquired spectral characteristic of the object by using an approximation expression including the acquired spectral characteristic of each of the plurality of color chips as variables;
a third acquisition step of acquiring an image signal value, which is obtained by imaging each of the plurality of color chips by an imaging device and which corresponds to color of a captured image, for each color chip; and
an estimation step of estimating the image signal value, which is obtained in a case where the object is imaged by the imaging device, based on the image signal value acquired in the third acquisition step for each color chip, and the approximation expression.

2. The image analysis method according to claim 1, wherein in the approximation step, the acquired spectral characteristic of the object is approximated by using the approximation expression having a plurality of terms composed of the acquired spectral characteristic of each of the plurality of color chips and coefficients by which each of the spectral characteristics are multiplied, and in the estimation step, the image signal value, which is obtained in a case where the object is imaged by the imaging device, is estimated by putting the image signal value corresponding to each of the terms, among the image signal values acquired in the third acquisition step for each color chip, into each of the plurality of terms included in the approximation expression.

3. The image analysis method according to claim 2, wherein in the approximation step, the acquired spectral characteristic of the object is approximated by using the approximation expression represented by a linear sum of the same number of the terms as the plurality of color chips.

4. The image analysis method according to claim 3, wherein in the approximation step, the coefficient of each of the plurality of terms is set within a range of −0.5 or more and 0.5 or less.

5. The image analysis method according to claim 2, wherein in the approximation step, the coefficient of each of the plurality of terms is set within a range of −0.5 or more and 0.5 or less.

6. The image analysis method according to claim 2, wherein in the third acquisition step, each of the plurality of color chips is imaged by a camera incorporating an image sensor that is the imaging device to acquire the image signal value for each color chip.

7. The image analysis method according to claim 2, wherein in the first acquisition step, a spectral reflectance of the object is acquired, and in the second acquisition step, a spectral reflectance of each of the plurality of color chips is acquired.

8. The image analysis method according to claim 2, wherein in the first acquisition step, a spectral transmittance of the object is acquired, and in the second acquisition step, a spectral transmittance of each of the plurality of color chips is acquired.

9. The image analysis method according to claim 2, wherein the plurality of color chips include a plurality of color charts having different colors from each other.

10. The image analysis method according to claim 1, wherein in the third acquisition step, each of the plurality of color chips is imaged by a camera incorporating an image sensor that is the imaging device to acquire the image signal value for each color chip.

11. The image analysis method according to claim 1, wherein in the first acquisition step, a spectral reflectance of the object is acquired, and in the second acquisition step, a spectral reflectance of each of the plurality of color chips is acquired.

12. The image analysis method according to claim 1, wherein in the first acquisition step, a spectral transmittance of the object is acquired, and in the second acquisition step, a spectral transmittance of each of the plurality of color chips is acquired.

13. The image analysis method according to claim 1, wherein the plurality of color chips include a plurality of color charts having different colors from each other.

14. The image analysis method according to claim 1, wherein the object is a sheet body that contains the specific coloring material and that develops color according to an amount of external energy in a case where the external energy is applied.

15. The image analysis method according to claim 14, wherein in the estimation step, the image signal value of a first object, to which a known amount of the external energy is applied, is estimated, and the image analysis method further comprises:

a fourth acquisition step of imaging a second object, to which an unknown amount of the external energy is applied, by the imaging device to acquire the image signal value of the second object; and a prediction step of predicting the amount of the external energy applied to the second object based on the acquired image signal value of the second object and the estimated image signal value of the first object.

16. The image analysis method according to claim 15, wherein in the prediction step, the amount of the external energy applied to the second object is predicted based on the acquired image signal value of the second object, and a correspondence relationship between the estimated image signal value of the first object and the amount of the external energy applied to the first object.

17. A non-transitory computer-readable recording medium on which a program for causing a computer to execute each step included in the image analysis method according to claim 1 is recorded.

18. An image analysis device comprising:

a processor, wherein the processor is configured to:

acquire a spectral characteristic of an object color-developed by using a specific coloring material;

acquire a spectral characteristic of each of a plurality of color chips, which are formed of coloring materials different from the specific coloring material and which have different colors from each other;

approximate the acquired spectral characteristic of the object by using an approximation expression including the acquired spectral characteristic of each of the plurality of color chips as variables;

acquire an image signal value, which is obtained by imaging each of the plurality of color chips by an imaging device and which corresponds to color of a captured image, for each color chip; and estimate the image signal value, which is obtained in a case where the object is imaged by the imaging device, based on the acquired image signal value for each color chip and the approximation expression.

19. The image analysis device according to claim 18, wherein the object is a sheet body that contains the specific coloring material and that develops color according to an amount of external energy in a case where the external energy is applied, the processor is configured to estimate, as the image signal value of the object, the image signal value of a first object to which a known amount of the external energy is applied, and the processor is further configured to:

acquire the image signal value of a second object when the second object, to which an unknown amount of the external energy is applied, is imaged by the imaging device, and predict the amount of the external energy applied to the second object based on the acquired image signal value of the second object, and a correspondence relationship between the estimated image signal value of the first object and the amount of the external energy applied to the first object.

* * * * *